United States Patent [19]

Deviney et al.

[11] Patent Number: 5,644,006

[45] Date of Patent: Jul. 1, 1997

[54] HIGH STRENGTH THERMOSET COPOLYMERS INCORPORATING MODIFIED BISOXAZOLINE MONOMERS.

[75] Inventors: Marvin L. Deviney; Joel J. Kampa, both of San Antonio, Tex.

[73] Assignee: Southwest Research Institute, San Antonio, Tex.

[21] Appl. No.: 502,302

[22] Filed: Jul. 13, 1995

Related U.S. Application Data

[63] Continuation of Ser. No. 324,115, Oct. 14, 1994, abandoned.

[51] Int. Cl.$^6$ .......................... C08F 283/00; C08G 8/28
[52] U.S. Cl. .................... 525/489; 528/187; 528/141; 528/153; 525/486; 525/502
[58] Field of Search .................... 528/137, 141, 528/153; 525/486, 489, 502

[56] References Cited

U.S. PATENT DOCUMENTS

| | | | |
|---|---|---|---|
| 4,430,491 | 2/1984 | Culbertson et al. | 528/153 |
| 4,551,511 | 11/1985 | Goel | 526/204 |
| 4,558,114 | 12/1985 | Goel | 528/73 |
| 4,579,875 | 4/1986 | Goel | 521/115 |
| 4,613,662 | 9/1986 | Goel | 528/137 |
| 4,626,575 | 12/1986 | Goel | 525/329.5 |
| 4,639,505 | 1/1987 | Goel | 528/211 |
| 4,640,969 | 2/1987 | Goel et al. | 528/73 |
| 4,644,052 | 2/1987 | Goel et al. | 528/363 |
| 4,652,620 | 3/1987 | Tufts et al. | 525/504 |
| 4,658,011 | 4/1987 | Goel | 528/409 |
| 4,661,600 | 4/1987 | Goel | 548/217 |
| 4,675,371 | 6/1987 | Goel | 526/260 |
| 4,699,970 | 10/1987 | Tiba et al. | 528/141 |
| 4,709,040 | 11/1987 | Goel | 548/237 |
| 4,737,572 | 4/1988 | Goel | 528/360 |
| 4,737,574 | 4/1988 | Goel | 528/374 |
| 4,746,719 | 5/1988 | Goel et al. | 528/137 |
| 4,748,230 | 5/1988 | Tiba et al. | 528/211 |
| 4,754,010 | 6/1988 | Goel | 526/260 |
| 4,762,883 | 8/1988 | Goel | 525/113 |
| 4,775,737 | 10/1988 | Goel | 528/167 |
| 4,806,267 | 2/1989 | Culbertson et al. | 252/182.23 |
| 4,814,223 | 3/1989 | Tiba et al. | 428/246 |
| 4,841,002 | 6/1989 | Culbertson et al. | 525/504 |
| 4,843,142 | 6/1989 | Sano et al. | 528/211 |
| 4,910,265 | 3/1990 | Matsumura et al. | 525/333.3 |
| 4,931,512 | 6/1990 | Matsumura et al. | 525/333.3 |
| 5,254,664 | 10/1993 | Narang et al. | 528/137 |
| 5,302,687 | 4/1994 | Culbertson et al. | 528/153 |
| 5,385,778 | 1/1995 | Deviney et al. | 428/319.7 |
| 5,403,655 | 4/1995 | Deviney et al. | 428/319.7 |

OTHER PUBLICATIONS

Culbertson et al., "Thermosetting Matrix Compositions With Improved Toughness To Meet New FAA Aircraft Interiors Fire Worthiness Requirements," pp. 1531–1545 33rd Int'l SAMPE Symposium (1988).

Culbertson et al., "Thermosetting Bisoxazoline–Phenolic Resin Matrix Materials for Aerospace Industry Applications," pp. 830–833, vol. 59 ACS Polymeric Materials Science & Engineering (1988).

Culbertson et al., "Bisoxazoline–Phenolic Resins: New Thermosetting Poly (Amide–Ether) Materials for Improved Performance Composites," pp. 590–604, 20th Int'l SAMPE Technical Conference (1988).

Culbertson et al., "Bisoxazoline–Phenolic Resin Step–Growth Copolymerizations: New Systems for Electronic, Mold Making, and Resin Transfer Molding." 8 pages, 34th Int'l SAMPE Symposium (1989).

DeViney et al., "SEM and X–Ray EDS Studies on the Adhesion of Novel Bisoxazoline–Phenolic Copolymers to Carbon and Glass Fibers, and Metallic Filler Surfaces," pp. 564–565, reprint 47th Annual Mtg of the Electron Microscopy Society of America (1989).

DeViney et al., "Bisoxazoline–Phenolic Resin Low Flammability Composites for Aircraft Interiors," 2 pp., 40th Anniversary Tech. Conf., ACS Div. Of Polymer Chemistry (1991).

Culbertson et al., "Bisoxazoline–Phenolic Resin Step–Growth Copolymerizations: A New Source of High Performance Matrix Resins for Composites," pp. 1–52, presented at SAMPE Int'l Symposium (May 11, 1989).

H. Rodriguez et al., "Kinetics of the Acid–Catalysed Ring–Opening Reaction of 2–Phenyl–4, 4–dimethyl–2–oxazolin–5–one with the Ethyl Ester of DL–Alanine," vol. 27, pp. 2425–2530 (1971).

Kobayashi, et al., "Kinetics and Mechanism of Cationic Polymerization of 5–Methyl–2–Oxazoline, Concurrent Propagation Through Ionic and Covalent Species with Methyl Iodide Initiator," Polymer Bulletin 11, pp. 253–260 (1984).

B.L. Rivas et al., "Cationic Polymerization of 2,4, 4–trimethyl–2–oxazoline," Polymer Bulletin 23, pp. 571–576 (1990).

*Primary Examiner*—Samuel A. Acquah
*Attorney, Agent, or Firm*—Madan & Morris, PLLC

[57] ABSTRACT

The present invention provides novel thermoset copolymers, and methods for preparing same, having both the strength and the thermo-oxidative stability required for high performance, high temperature applications. The copolymers comprise (a) a thermoplastic resin having unreacted phenolic OH groups, and (b) bis-oxazoline monomers which have been modified to have at least one substituent on the oxazoline ring selected from the group consisting of a methyl group, a group having at least a substituent capable of undergoing addition polymerization, and a cyclic group capable of undergoing ring opening polymerization.

18 Claims, No Drawings

HIGH STRENGTH THERMOSET COPOLYMERS INCORPORATING MODIFIED BISOXAZOLINE MONOMERS.

FIELD OF THE INVENTION

This is a continuation-in-part of application No. 08/324,115 filed on Oct. 14, 1994, now abandoned.

The present invention relates to novel thermoset copolymers comprised of a thermoplastic resin with unreacted phenolic OH groups and modified bisoxazoline monomers, and to methods of making said copolymers. The modified bisoxazoline monomers act as crosslinking agents, which impart strength and stability to the copolymers. After exposure to temperatures of about 177° C. (350° F.) and greater, the copolymers have greater structural strength remaining than prior art copolymers comprised of unmodified bisoxazoline monomers.

BACKGROUND OF THE INVENTION

Copolymers of non-modified 2,2'-(1,3-phenylene)bis (oxazoline) and phenolic novolak resins in which the bisoxazoline monomer acts as a cross-linking agent (and secondarily as a chain extending agent) have been reported in the literature. These copolymers offer high values of modulus, strength, toughness, heat deflection temperature and interlaminar shear (i.e. strong bonding to carbon fibers and fiberglass). The reported bisoxazoline and phenolic novolak copolymers also have much better thermo-oxidative stability than epoxy resins and almost all other thermoset resins, with the exception of polyimides.

Polyimides have higher thermo-oxidative stability than reported bisoxazoline and phenolic novolak copolymers; however, polyimides do not have the necessary strength for high performance airframe (non-engine) applications. A polyimide probably would have the thermooxidative stability required for supersonic commercial or military aircraft parts exposed to surface skin temperatures of about 177° C. (350° F.) and above. However, because of microvoids, microcracking, etc., a thermoset polyimide would be not be strong enough for adequate service life of large supersonic jet parts, such as wings and tail sections.

The material used to manufacture such parts must have thermo-oxidative stability at temperatures above about 177° C. (350° F.) because new products require such features. For example, the new supersonic NASA HSCT (high speed civil transport) will operate for many hours (per flight) at speeds of about Mach 2.2 with skin temperatures of at least about 177° C. (350° F.). Supersonic military fighter aircraft also may operate with at least about 177° C. (350° F.) skin temperatures, but for shorter times than in the HSCT case. Other applications requiring thermo-oxidative stability at temperatures above about 177° C. (350° F.) include: high temperature electrical applications, such as transformer housings, submersible vessel support structures (i.e., near nuclear reactors), certain steel manufacturing applications (i.e., for high temperature gaskets), etc.

Unfortunately, known thermoset resins that have the necessary strength for such parts do not also have the increased, long term, thermal oxidative stability required for components used in high performance, high temperature applications. Bisoxazoline and phenolic novolak copolymers possess the requisite strength and have much better thermo-oxidative stability than many resins; however, known bisoxazoline and phenolic novolak copolymers do not have sufficient thermo-oxidative stability for many of these high performance, high strength applications. Consequently, a need exists for a thermoset resin which has increased, long term, thermal oxidative stability, as well as other desirable characteristics, such as high values of modulus, strength, toughness, heat deflection temperature, and interlaminar strength.

SUMMARY OF THE INVENTION

The present invention provides novel thermoset copolymers, and methods for preparing same, having both the strength and the thermo-oxidative stability required for high performance, high temperature applications. The copolymers comprise (a) a thermoplastic resin having unreacted phenolic OH groups, and (b) bis-oxazoline monomers which have been modified to have at least one substituent on the oxazoline ring selected from the group consisting of a methyl group, a group having at least a substituent capable of undergoing addition polymerization, and a cyclic group capable of undergoing ring opening polymerization.

DETAILED DESCRIPTION OF THE INVENTION

The Modified Bisoxazoline Monomer

The thermoset copolymers of the present invention comprise copolymers of a thermoplastic resin having unreacted phenolic OH groups and modified bis-oxazoline monomers having the following general formula:

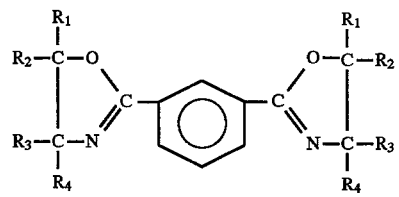

wherein $R^1$, $R^2$, $R^3$, and $R^4$ independently are selected from the group consisting of hydrogen, a methyl group, a group having at least a substituent that is capable of undergoing addition polymerization, and a cyclic group capable of undergoing ring opening polymerization, provided that at least one of $R^1$, $R^2$, $R^3$, and $R^4$ must be selected from the group consisting of a methyl group, a group having at least a substituent capable of undergoing addition polymerization, and a cyclic group capable of undergoing ring opening polymerization, and provided that, if one of $R^1$, $R^2$, $R^3$, and $R^4$ is a methyl group, the remaining groups are hydrogen. In a preferred embodiment, two of $R^1$, $R^2$, $R^3$, and $R^4$ are hydrogens.

Groups that are capable of undergoing addition polymerization include, but are not necessarily limited to, substituted vinyl groups, such as vinyl benzoate and 4-vinyl phenyl groups, substituted ethynyl groups, such as trifluoromethyl ethynyl groups and phenyl ethynyl groups, norbornyl groups, nadic imide groups, other norbornyl type groups, cyclobutenyl groups, cyclophane groups, and groups bound into the oxazoline at the 4- and 5- positions to form bicyclic compounds, such as the following:

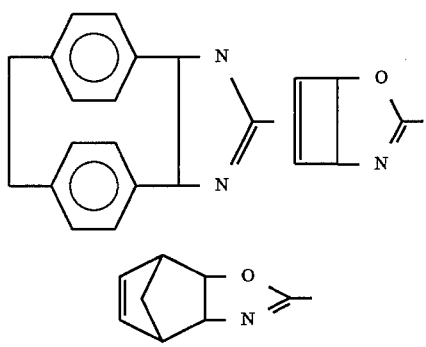

Groups that are capable of ring opening polymerization include, but are not necessarily limited to norbornyl groups, cyclobutenyl groups, and cyclophane groups.

Other examples of suitable substituents for the oxazoline ring include, but are not necessarily limited to, the following:

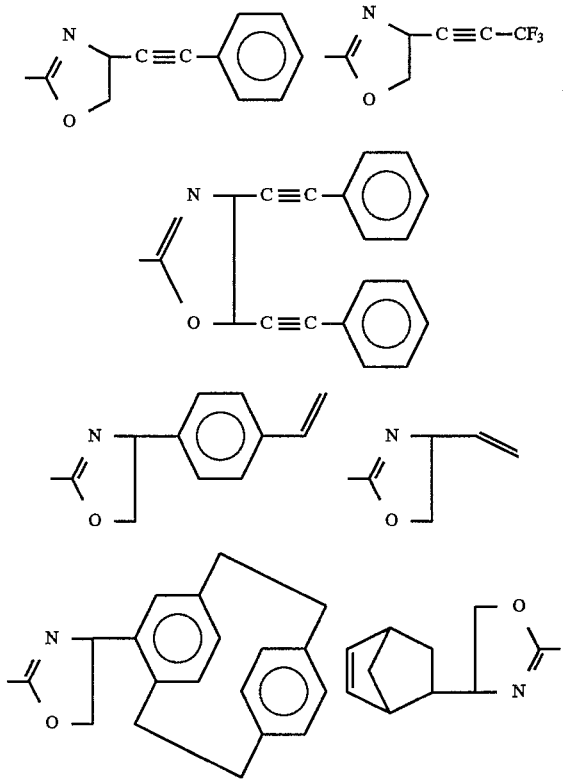

Generally, the thermoset copolymers of the present invention comprise (a) between about 10–90 wt %, preferably between about 20–60 wt % of thermoplastic resin, and (b) between about 10–90 wt %, preferably between about 40–80 wt % of modified bisoxazoline monomer.

A preferred embodiment has ethynyl groups as substituents on vicinal carbons, preferably trifluoromethyl ethynyl groups or phenylethynyl groups. Trifluoromethyl ethynyl groups undergo addition polymerization as follows to produce the following aromatic structure:

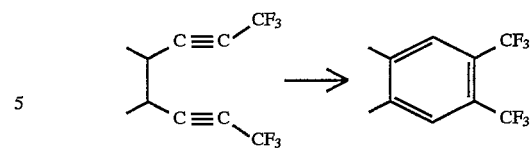

The modified bisoxazolines of the present invention may be made in a number of ways. In a preferred method, a dicyanobenzene, preferably a 1,3-dicyanobenzene or a 1,4-dicyanobenzene, most preferably a 1,3-dicyanobenzene, is reacted with either an amino diol or a diamino alcohol. This reaction is believed to form intermediate compounds having protic groups that are capable of undergoing condensation reactions to add desired substituents, preferably via reaction with an appropriate carboxylic acid, acid halide, or acid anhydride.

A preferred amino diol for use in the foregoing method is serinol, which is available from Aldrich Chemical Company. Another suitable amino diol is 3-amino-1,2-propanediol, also available from Aldrich Chemical Co. Serinol is preferred because it forms a single isomer as a product. A preferred diamino alcohol is 1,3-diamino-2-hydroxypropane, which is available from Aldrich Chemical Co. Another suitable diamino alcohol is 2,3-diaminopropanol, which may be synthesized as described in Spirsyn, V. I., et al. *Zh. Neorg. Khim.* 27:4 (1982) 839–43, incorporated herein by reference. See also Chem. Abstracts 97:84030, incorporated herein by reference.

Examples of suitable carboxylic acids and acid halides for use in the foregoing reaction include, but are not limited to, 4-ethynyl benzoyl chloride, which may be synthesized as shown in P. Hergenrother, "Ethynyl-Terminated Polysulfones: Synthesis and Characterization," *J. Polgmer Science,* Polymer Chem. Ed. 21, 3131 (1982), incorporated herein by reference; maleic anhydride, available from a number of sources, including Aerchem, Inc.

The modified bisoxazoline compounds also may be prepared by reacting, in order of preference, 1,3-dicyanobenzene, 1,4-dicyanobenzene, or 1,2-dicyanobenzene with an ethanolamine substituted with a desired substituent at about 125°–150° C. (257°–302° F.). For example, if the desired modified bisoxazoline compound has the oxazoline groups at the 1' and 3' position of the benzene ring and the oxazoline groups have vinyl groups at the 4 carbon position (the carbon next to the imine group), then 3-amino-1-butene-4-ol should be reacted with 1,3-dicyanobenzene at a temperature of about 125° C.–150° C. (257°–302° F.) in the presence of a suitable catalyst.

The modified bisoxazoline compounds also may be prepared by reacting 1,3-benzene dicarboxylic acid with methanol in the presence of a slight amount of acidic catalyst to yield the dimethyl ester. An appropriately substituted ethanolamine is reacted with the dimethyl ester to form the bis-hydroxy terminated amide, which can be cyclized to the desired modified bisoxazoline under dehydrating conditions (i.e., fuming sulfuric acid or $SOCl_2$). Alternately, the corresponding acid halide may be substituted for the dimethyl ester to form the diamide. Again, any appropriately substituted ethanolamine can be used to obtain the desired modified bisoxazoline compound.

The ethanolamines required to manufacture the bisoxazolines preferably are either 2-amino-1-propanol, available from BASF Corporation, or have at least one substituent that is either capable of undergoing addition polymerization or is a cyclic group capable of undergoing ring opening polymerization. Such substituents include, but are not necessarily limited to, substituted vinyl groups, such as vinyl benzoate and 4-vinyl phenyl groups, substituted ethynyl groups, such as trifluoromethyl ethynyl groups and phenyl ethynyl groups, norbornyl groups, nadic imide groups, other norbornyl type groups, cyclobutenyl groups, cyclophane groups, and groups bound into the oxazoline at the 4- and 5-positions to form bicyclic compounds, such as those depicted above.

The Thermoplastic Novolak Resin

The thermoplastic resins that are useful in the present invention generally are novolak resins, which are condensation products made from a methylene donor and a methylene acceptor. Examples of methylene donors include formaldehyde, paraformaldehye, N-(substituted oxymethyl) melamine, hexamethylenetetramine, and hexamethoxymethylmelamine. Examples of methylene acceptors are phenol, dihydroxybenzene compounds, including resorcinol and resorcinolic esters and trihydroxybenzene compounds or esters thereof. The novolak resins have at least one aromatic hydroxy group per repeating unit. Novolak resins of this type include phenolic novolak resins, resorcinolic novolak resins, and pyrogallolic novolak resins.

The novolak resin also may include a variety of substituent groups with the sole requirement being that the substituent group must not be reactive with oxazoline groups and/or aromatic hydroxyl groups. Examples of such substituent groups include, but are not necessarily limited to: alkyl, aryl, cyano, nitro, alkoxy, aryloxy, alky and aryl sulfides, alkyl or aryl substituted tertiary amines, amides, etc. Resins of this type include the cresol novolak resin.

A preferred thermoplastic resin is a formaldehyde-phenolic novolak resin.

The Novel Thermoset Copolymers

The thermoset copolymers generally are prepared by heating a mixture of a thermoplastic resin having unreacted phenolic OH groups and modified bisoxazoline monomers having general formula given above, for a sufficient time and temperature to melt the thermoplastic resin and the modified bisoxazoline monomers to yield a molten homogeneous mixture.

Due to the difficulty in determining equivalent weights of a novolak resin, the percentages of the starting materials are described in weight percents. If a method to determine the equivalent weights of a novolak resin was made available, then a stoichiometric mix of aromatic hydroxyl groups and oxazoline rings is desired. Since each mole of bisoxazoline has 2 equivalent weights of oxazoline, a stoichiometric mix would require between about 0.5 to about 1.5 equivalent weight of modified bisoxazoline dissolved in about 1 equivalent weight of aromatic hydroxy groups attached to the novolak resin. A preferred range is between about 0.8 to about 1.2 equivalent weight of the modified bisoxazoline monomer compound per about 1 equivalent weight of aromatic hydroxy groups attached to the novolak compound.

The melting temperature of the mixture is between about 121°–149° C. (250°–300° F.). At room temperature the modified bisoxazoline monomers are crystalline solids or viscous oils or liquids. Between temperatures of about 121°–149° C. (250°–300° F.) the modified bisoxazoline monomers are melted and the novolak resin is a viscous liquid. However, the mixed melt with both components can have viscosities as low as about 100 centipoises at temperatures between about 149°–177° C. (300°–350° F.).

After melting, the melted mixture is cured for a sufficient time and at a sufficient temperature to open at least a portion of the oxazoline rings of the modified bisoxazoline monomers such that at least a portion of the open oxazoline rings create crosslinks in the thermoset copolymer composition.

In a preferred process, a catalyst is added to the melted mixture to aid in opening the oxazoline rings and in reducing curing time. The catalyst may be selected from the group consisting of: ammonium and phosphonium salts of tetrafluoroborate, hexafluorophosphate, and hexafluoroarsenates; para-toluene sulfonic acid; diphenyl phosphite; diphenyl phosphine; and, boron triflouride. Preferred catalysts are diphenyl phosphite and dialkyl phosphites. Without a catalyst, the process usually requires a curing time of between about 8 to about 20 hours at a temperature between about 175°–225° C. (347°–437° F.). With the catalyst, the process usually requires a curing time of between about 1–3 hours at the same temperature.

After this initial curing step, during which the initial oxazoline aromatic hydroxyl cross-linking reactions occur, a second curing step should be performed. The temperature of this second curing step will differ depending upon the substituents attached to the monomer. The temperature of the second curing step should be high enough to trigger the thermally initiated addition polymerization or ring opening polymerization for that substituent. Generally, the temperature of this second curing step will be between about 225°–325° C. (437°–617° F.), preferably between about 300°–325° C. (572°–617° F.). Where the copolymer is substituted with ethynyl benzoate or a nadic imide group, a preferred temperature for the second curing step is between about 225°–315° C. (437°–599° F.), preferably between about 300°–315° C. (572°–599° F.). Where the substituent is p-vinyl benzoate, a preferred temperature for the second curing step is between about 225°–325° C. (437°–617° F.), preferably between about 300°–325° C. (572°–617° F.). The second curing step should take place in the absence of air for between about 1–3 hours, preferably about 2 hours.

The thermoset copolymers of the invention may be cured using autoclave conditions or resin transfer molding, depending upon the product and shape in which composites of the copolymer will be used. Also, rapid, cost-effective pultrusion and filament winding techniques, combined with appropriate curing ovens or enclosures, may be used to prepare high performance composites or copolymers with improved heat-resistant and high strength reinforcements, such as carbon fiber, fiberglass, and/or polymer-based fibers, such as Kevlar. Without limiting the present invention, products that may be prepared using the thermoset copolymers of the invention include aircraft structural parts (such as wing, tail, and fuselage components), supersonic aircraft nonengine components, submarine internal structures, electronic circuit boards, and other products which require high strength and the capability of resisting high temperatures [about 177° C. (350° F.) and higher] without significant oxidation or loss of long-term load-bearing capability.

The resulting thermoset copolymer, when exposed to temperatures of at least about 177° C. (350° F.) for at least about 500 hours should exhibit less than 0.1% weight loss. At between about 191°–204° C. (375°–400° F.), the weight loss should be only very slightly more after about 500 hours exposure, but the composites still should retain substantial mechanical strength properties. This lack of weight loss indicates that the thermoset copolymers do not undergo undesirable thermo-oxidation at high temperatures. In addition, the performance of the second curing step should increase the glass transition temperature ($T_g$) of the resulting thermoset copolymer by at least about 50° C. (122° F).

Without limiting the invention to a particular theory, the prior art bisoxazoline-phenolic copolymers are believed to undergo thermo-oxidation due to thermo-oxidative attack on the ethylene bridge between the amide and ether units resulting from the opening of the oxazoline ring upon polymerization with aromatic hydroxyl groups. The replacement of the hydrogens on the ethylene bridge with a group capable of undergoing addition polymerization results in an increased number of bonds that must undergo thermal cracking before any weight loss to the bulk polymer results.

The invention will be better understood with reference to the following examples, which are intended to be illustrative only.

EXAMPLE 1

50 mL of chlorobenzene, 15 mL of 2-amino-1-propanol, 5 g of 1,3-dicyanobenzene, and 0.5 g $Cd(O_2CCH_3)_2 \cdot 2 H_2O$ were combined in a round-bottomed flask equipped with a reflux condenser, magnetic stirring, and a nitrogen inlet. The solution was refluxed at 132° C. (270° F.) for 24 hr. The solvent was then removed and the product, 4,4'-dimethyl-2, 2'-(1,3-phenylene)bis(oxazoline), was recrystallized from chloroform.

EXAMPLE 2

50 g of isophthalic acid is refluxed at 165° C. (329° F.) for 18 hr in 150 mL of 2-amino-1-propanol. The bulk of the excess amino alcohol is then distilled off and the remaining viscous liquid dissolved in 200 mL of 2% NaOH. The resulting bis-N-(1-methyl-2-hydroxyethyl)isophthalamide is then precipitated in acetone, filtered and dried. To 10 g of the aforementioned diamide is slowly added 300 mL of thionyl chloride with stirring. The mixture is then heated to reflux (79° C., 174° F.) for approximately 1 hour, after which time the homogenous yellow solution is cooled and poured into diethylether to precipitate the 4,4'-dimethyl-2,2'-(1,3-phenylene)bis(oxazoline) hydrochloride salt. The salt is neutralized using 20% NaOH and the free base extracted into ether. The organic phase is then dried and evaporated to give 4,4'-dimethyl-2,2'-(1,3-phenylene)bis(oxazoline).

EXAMPLE 3

25 g of the 4,4'-dimethyl-2,2'-(1,3-phenylene)bis (oxazoline) produced in Example 2 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr and postcured at 200° C. (392° F.) for an additional 2 hr. After heating in an oven at 177° C. (349° F.) for 500 hrs, the resulting copolymer showed no weight loss. After 500 hours at 200° C. (392° F.), the copolymer showed a 0.5% weight loss.

EXAMPLE 4

15 mL of serinol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of 11.5 g of 2,2'-(1,3-phenylene)bis(4-methoxy)oxazoline. 4-ethynyl benzoyl chloride, is synthesized as described in P. Hergenrother, *J. Polymer Science,* Polymer Chem. Ed. 21, 3131 (1982), incorporated herein by reference. 25 g of the 4-ethynyl benzoyl chloride are combined with the 2,2'-(1,3-phenylene)bis(4-methoxy)oxazoline and the solution is stirred overnight in 100 ml of THF with a stoichiometric amount of triethylamine, resulting in the formation of 2,2'-(1,3-phenylene)bis(4-methoxy-4-ethynyl benzoate)oxazoline.

EXAMPLE 5

23 g of the 2,2'-(1,3-phenylene)bis(4-methoxy-4-ethynyl benzoate)oxazoline from Example 4 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 177° C. (349° F.) for 500 hrs, the resulting copolymer shows no weight loss. After 500 hours at 200° C. (392° F.), the copolymer shows less than a 0.1% weight loss.

EXAMPLE 6

15 mL of 3-amino-1,2-propanediol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of about 5 g of a mixture of 2,2'-(1,3-phenylene)bis(5-hydroxyl)oxazine and 2,2'-(1, 3-phenylene)bis(4-methoxy)oxazoline. 7 g of 4-ethynyl benzoyl chloride is stirred overnight in 100 ml of THF with a stoichiometric amount of triethylamine, resulting in the formation of a mixture of 2,2'-(1,3-phenylene)bis(5-ethynyl benzoate)oxazine and 2,2'-(1,3-phenylene)bis(5-methoxy-4-paraethynyl benzoate)oxazoline.

EXAMPLE 7

23 g of the oxazine/oxazoline mixture from Example 6 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 177° C. (349° F.) for 500 hrs, the resulting copolymer shows no weight loss. After 500 hours at 200° C. (392° F.), the copolymer shows less than a 0.1% weight loss.

EXAMPLE 8

15 mL of 2,3-diaminopropanol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of a mixture of about 4 g of 2,2'-(1,3-phenylene)bis(5-amine)oxazine and about 6 g of 2,2'-(1,3-phenylene)bis(4-methylamine)oxazoline.

12 g of maleic anhydride are combined with this product and stirred overnight in 100 ml of THF with a stoichiometric amount of triethylamine, resulting in the formation of a mixture of compounds having the following structures:

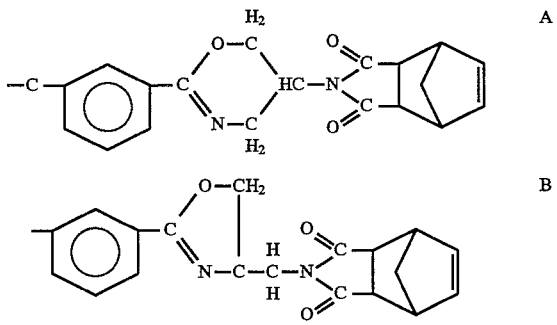

EXAMPLE 9

21 g of the mixture from Example 8 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 177° C. (349° F.) for 500 hrs, the resulting copolymer shows no weight loss. After 500 hours at 200° C. (392° F.), the copolymer shows less than a 0.1% weight loss.

EXAMPLE 10

15 mL of serinol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of 11 g of 2,2'-(1,3-phenylene)bis(4-methoxy)oxazoline.

15 g of p-vinyl benzoyl chloride, obtained from Aldrich Chemical Co., are combined with the 2,2'-(1,3-phenylene) bis(4-methoxy)oxazoline and stirred overnight in 100 ml of THF with a stoichiometric amount of triethylamine, resulting in the formation of 2,2'-(1,3-phenylene)bis(4-methoxy-4-p-vinyl-benzoate)oxazoline.

EXAMPLE 11

20 g of the 2,2'-(1,3-phenylene)bis(4-methoxy-4-p-vinyl-benzoate)oxazoline from Example 10 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 200° C. (392° F.) for 500 hrs, the resulting copolymer shows no weight loss. After 500 hours at 225° C. (437° F.), the copolymer shows less than a 0.1% weight loss.

EXAMPLE 12

15 mL of serinol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of 12 g of 2,2'-(1,3-phenylene)bis(4-methoxy)oxazoline. 10 g of acryloyl chloride, obtained from BASF Corp., are combined with the 2,2'-(1,3-phenylene)bis(4-methoxy)oxazoline and stirred overnight in 100 ml of THF with a stoichiometric amount of triethylamine, resulting in the formation of 2,2'-(1,3-phenylene)bis(4-methoxyacrylate)oxazoline.

EXAMPLE 13

18 g of the 2,2'-(1,3-phenylene)bis(4-methoxyacrylate) oxazoline from Example 12 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 200° C. (392° F.) for 500 hrs, the resulting copolymer shows no weight loss. After 500 hours at 225° C. (437° F.), the copolymer shows less than a 0.1% weight loss.

EXAMPLE 14

15 mL of 1,3-diamino-2-hydroxypropane and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of 11.5 g of 2,2'-(1,3-phenylene)bis(5-methylamine)oxazoline.

22 g of nadic anhydride, also known as monomethyl ester of 5-norbornene 2,3-dicarboxylic anhydride, obtained from Aldrich Chemical Co., are combined with 11.5 g of the 2,2'-(1,3-phenylene)bis(5-methylamine)oxazoline and stirred overnight in THF, resulting in the formation of a compound having the following structure:

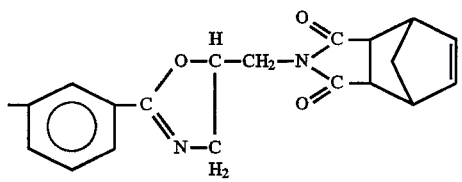

EXAMPLE 15

20 g of the product from Example 14 is melted with 10.6 g of phenolic novolak resin at 150° C. (302° F.). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 200° C. (392° F.) for 500 hrs, the resulting copolymer shows no weight loss. After 500 hours at 225° C. (437° F.), the copolymer shows less than a 0.1% weight loss.

EXAMPLE 16

15 mL of 2,3-diaminopropanol and 5 g of 1,3-dicyanobenzene are combined in a round-bottomed flask equipped with a reflux condenser, magnetic stirring, and a nitrogen inlet. The solution is refluxed at 132° C. (270° F.) for 24 hr, resulting in the formation of 10.5 g of a mixture of 2,2'-(1,3-phenylene)bis(5-amine)oxazine and 2,2'-(1,3-phenylene)bis(4-methylamine)oxazoline.

20 g of nadic anyhydride are combined with this mixture and the solution is refluxed in THF overnight, resulting in the formation of a mixture of compounds having the following structures:

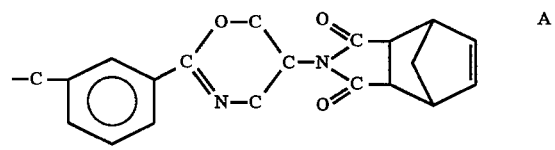

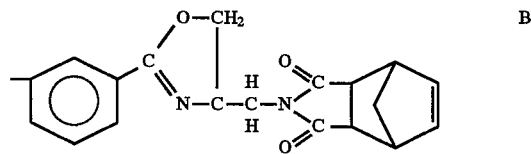

EXAMPLE 17

19.5 g of the mixture from Example 16 is melted with 10.6 g of phenolic novolak resin at 150° C. (302° F). After adding 0.37 g diphenyl phosphite, the melt is degassed and poured into a suitably prepared mold. The thermoset is cured at 180° C. (356° F.) for 3 hr. The temperature is increased to 300° C. (572° F.) in the absence of air for 2 hours. After heating in an oven at 200° C. (392° F.) for 500 hrs, the resulting copolymer shows no weight loss. After 500 hours at 230° C. (446° F.), the copolymer shows less than a 0.1% weight loss.

Although the invention has been described with reference to specific embodiments, this description is not meant to be construed in a limited sense. Various modification of the disclosed embodiments, as well as alternative embodiments of the inventions will become apparent to persons skilled in the art upon the reference to the description of the invention. The appended claims are intended to cover such modifications that fall within the scope of the invention.

We claim:

1. A thermoset copolymer composition, comprising:

between about 10–90 percent by weight of a thermoplastic resin having unreacted phenolic OH groups; and between about 10–90 percent by weight of a modified bis-oxazoline monomer having the following general formula:

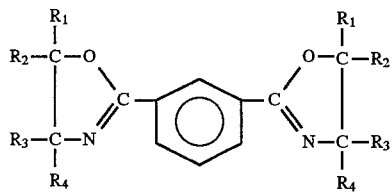

wherein $R^1$, $R^2$, $R^3$, and $R^4$ independently are selected from the group consisting of hydrogen, methyl groups, substituted vinyl groups, substituted ethynyl groups, norbornyl groups, nadic imide groups, cyclobutenyl groups, cyclophane groups, groups bound into the oxazoline at the 4- and 5-positions to form bicyclic compounds, and substituents having the following structure:

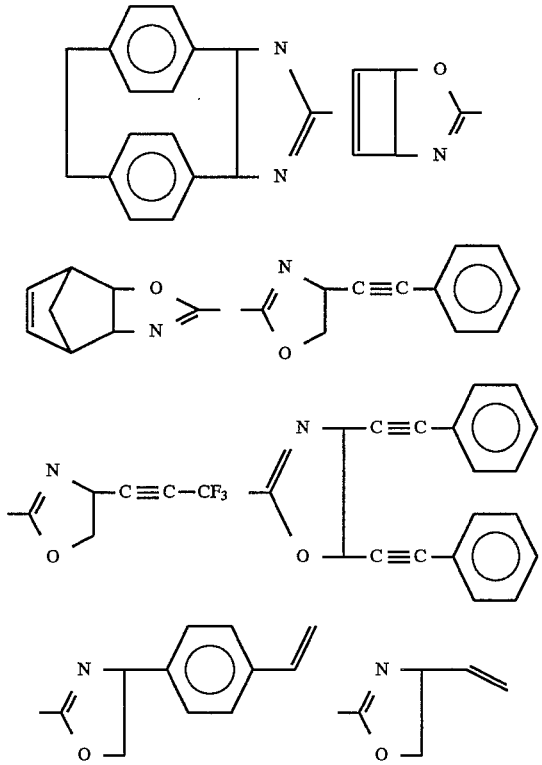

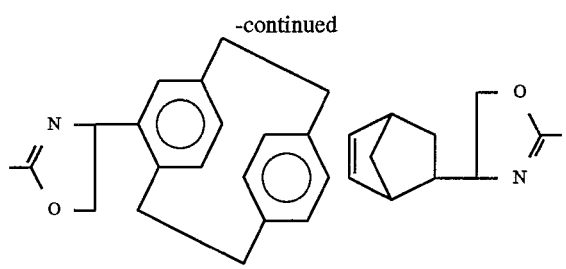

provided that at least one of $R^1$, $R^2$, $R^3$, and $R^4$ must not be hydrogen, and further provided that, if one of $R^1$, $R^2$, $R^3$, and $R^4$ is a methyl group, the remaining R groups are hydrogen.

2. The thermoset copolymer composition of claim 1, wherein said thermoplastic resin is present in an amount between about 20–60 percent by weight; and said modified bisoxazoline monomers are present in an amount between about 40–80 percent by weight.

3. The thermoset copolymer composition of claim 1, wherein said thermoplastic resin is selected from the group consisting of a phenolic novolak resin, a resorcinolic novolak resin, a cresol novolak resin, a pyrogallolic novolak resin, and mixtures thereof.

4. The thermoset copolymer composition of claim 2, wherein said thermoplastic resin is selected from the group consisting of a phenolic novolak resin, a resorcinolic novolak resin, a pyrogallolic novolak resin, a cresol novolak resin, and mixtures thereof.

5. A process for preparing a thermoset copolymer composition, comprising:

heating a mixture for a first amount of time and at a first temperature sufficient to melt said mixture, wherein said mixture comprises a thermoplastic resin having unreacted phenolic OH groups and modified bisoxazoline monomers having the following general formula:

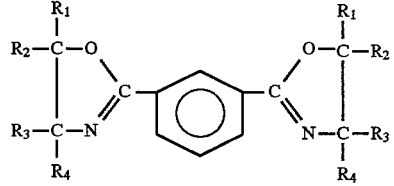

wherein $R^1$, $R^2$, $R^3$, and $R^4$ independently are selected from the group consisting of hydrogen, methyl groups, substituted vinyl groups, substituted ethynyl groups, norbornyl groups, nadic imide groups, cyclobutenyl groups, cyclophane groups, groups bound into the oxazoline at the 4- and 5-positions to form bicyclic compounds, and substituents having the following structure:

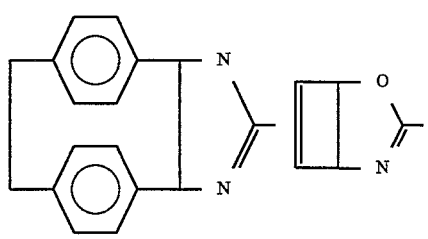

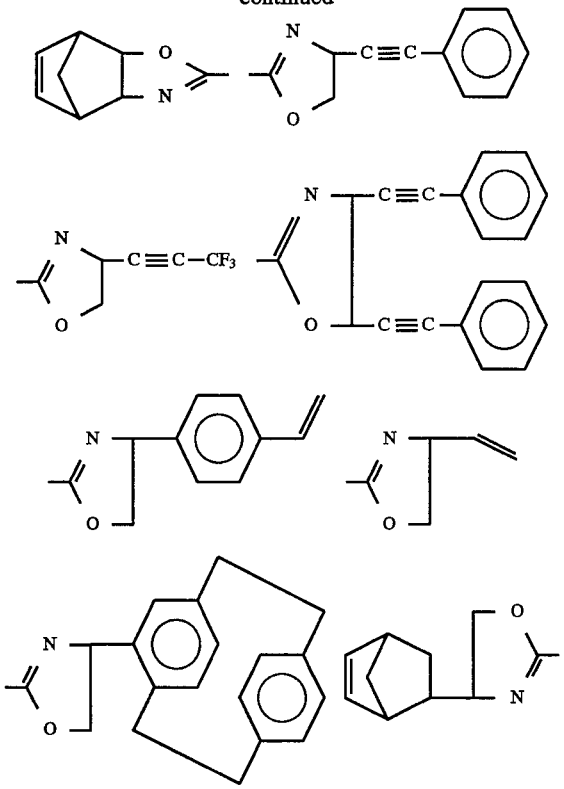

provided that at least one of $R^1$, $R^2$, $R^3$, and $R^4$ must not be hydrogen, and further provided that, if one of $R^1$, $R^2$, $R^3$, and $R^4$ is a methyl group, the remaining R groups are hydrogen;

curing said melted mixture for a second amount of time and at a second temperature sufficient to open at least some oxazoline rings in said modified bisoxazoline monomers and to create crosslinks in said thermoset copolymer composition via at least a portion of said open oxazoline rings.

6. The process of claim 5 further comprising the step of curing said melted mixture for a third amount of time and at a third temperature sufficient to trigger addition polymerization or ring opening polymerization of substituents on said oxazoline rings.

7. The process of claim 5, further comprising the step of adding a catalyst to said melted mixture to aid in opening said oxazoline rings and to reduce said second amount of time.

8. The process of claim 7 wherein said catalyst is selected from the group consisting of: ammonium and phosphonium salts of tetrafluoroborate, hexafluorophosphate, and hexafluoroarsenate; para-toluene sulfonic acid; diphenyl phosphite; dialkyl phosphite; diphenyl phosphine; and, boron triflouride.

9. The process of claim 6, further comprising the step of adding a catalyst to said melted mixture to aid in opening said oxazoline rings and to reduce said second amount of time.

10. The process of claim 9 wherein said catalyst is selected from the group consisting of: ammonium and phosphonium salts of tetrafluoroborate, hexafluorophosphate, and hexafluoroarsenate; para-toluene sulfonic acid; diphenyl phosphite; dialkyl phosphite; diphenyl phosphine; and, boron triflouride.

11. The process of claim 5, wherein said first temperature is between about 121°–149° C. (250°–300° F.); and said second amount of time is between about 8–20 hours; and said second temperature is between about 175°–225° C. (347°–437° F.).

12. The process of claim 6, wherein said first temperature is between about 121°–149° C. (250°–300° F.); and said second amount of time is between about 8–20 hours; and said second temperature is between about 175°–225° C. (347°–437° F).

13. The process of claim 6 wherein said third amount of time is between about 1–3 hours; and said third temperature is between about 225°–325° C. (437°–617° F).

14. The process of claim 6, wherein said first amount of time is between about 8–20 hours;

said first temperature is between about 121°–149° C. (250° F.–300° F.); and said second temperature is between about 175°–225° C. (347° F.–437° F.).

15. The process of claim 7, wherein said first temperature is between about 121°–149° C. (250°–300° F.); and said second amount of time is between about 1–3 hours; and said second temperature is between about 175°–225° C. (347°–437° F).

16. The process of claim 5, wherein said thermoplastic resin is present in an amount between about 40–60 percent by weight;

said modified bisoxazoline monomers are present in an amount between about 40–80 percent by weight; and said thermoplastic resin is selected from the group consisting of a phenolic novolak resin, a resorcinolic novolak resin, a pyrogallolic novolak resin, a cresol novolak resin, and mixtures thereof.

17. A thermoset copolymer composition, comprised of:

a thermoplastic resin having unreacted phenolic OH groups;

modified bisoxazoline monomers having the following general formula:

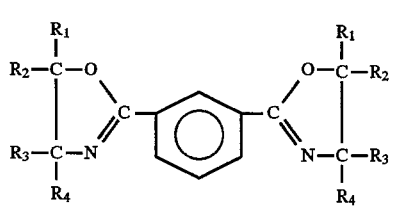

wherein $R^1$, $R^2$, $R^3$, and $R^4$ independently are selected from the group consisting of hydrogen, methyl groups, substituted vinyl groups, substituted ethynyl groups, norbornyl groups, nadic imide groups, cyclobutenyl groups, cyclophane groups, and groups bound into the oxazoline at the 4- and 5-positions to form bicyclic compounds, and substituents having the following structure:

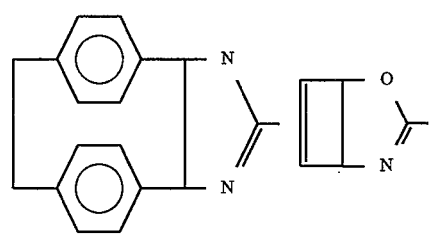

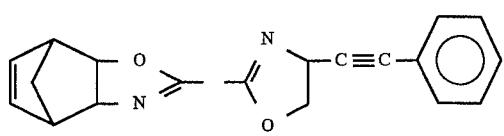

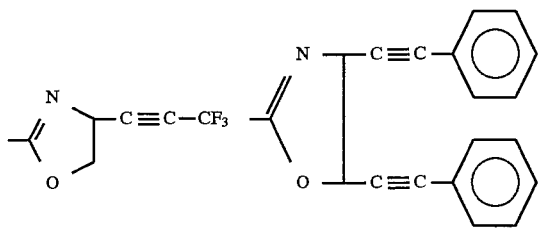

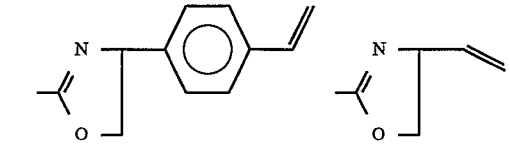

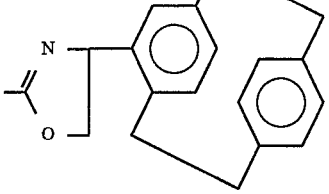 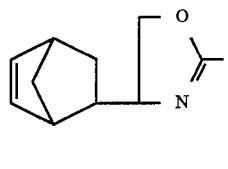

provided that at least one of $R^1$, $R^2$, $R^3$, and $R^4$ must not be hydrogen, and further provided that, if one of $R^1$, $R^2$, $R^3$, and $R^4$ is a methyl group, the remaining R groups are hydrogen.

18. The thermoset copolymer composition of claim 17, wherein said thermoplastic resin is selected from the group consisting of a phenolic novolak resin, a resorcinolic novolak resin, a pyrogallolic novolak resin, a cresol novolak resin, and mixtures thereof.

* * * * *